United States Patent
Ning et al.

(10) Patent No.: US 10,320,745 B2
(45) Date of Patent: Jun. 11, 2019

(54) APPARATUS AND METHOD FOR TRANSPARENT, SECURE ELEMENT-BASED MEDIATION OF ON-BOARD DIAGNOSTIC OPERATIONS

(71) Applicant: Samsung Electronics Co., Ltd., Suwon-si, Gyeonggi-do (KR)

(72) Inventors: Peng Ning, Mountain View, CA (US); Stephen E McLaughlin, Mountain View, CA (US); Michael C Grace, Mountain View, CA (US); Ahmed M Azab, Mountain View, CA (US); Rohan Bhutkar, Mountain View, CA (US); Wenbo Shen, Mountain View, CA (US); Xun Chen, Mountain View, CA (US); Yong Choi, Mountain View, CA (US); Ken Chen, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 15/048,531

(22) Filed: Feb. 19, 2016

(65) Prior Publication Data
US 2017/0041290 A1 Feb. 9, 2017

Related U.S. Application Data

(60) Provisional application No. 62/201,457, filed on Aug. 5, 2015.

(51) Int. Cl.
*G06F 21/00* (2013.01)
*H04L 29/06* (2006.01)
(Continued)

(52) U.S. Cl.
CPC ........ *H04L 63/0209* (2013.01); *G06F 13/102* (2013.01); *G06F 13/4068* (2013.01);
(Continued)

(58) Field of Classification Search
CPC ...... G06F 21/121; G06F 21/123; G06F 21/60; G06F 21/604; G06F 21/606; G06F 21/62; G06F 21/629; G06F 21/64
See application file for complete search history.

(56) References Cited

U.S. PATENT DOCUMENTS

2002/0023223 A1* 2/2002 Schmidt ................. B60R 25/24
713/187
2013/0268156 A1* 10/2013 Schumann ............. G07C 5/085
701/31.4
(Continued)

*Primary Examiner* — Edward Zee
(74) *Attorney, Agent, or Firm* — Jefferson IP Law, LLP

(57) ABSTRACT

An apparatus and method of an attachment device for interfacing with an on-board diagnostic system of a vehicle is provided. The device includes an application processor configured to receive input from a terminal, control processing of the input by the on-board diagnostic system, transmit a result of the processing of the input by the on-board diagnostic system to the terminal, and a secure element interposed in the communication path between the application processor and the on-board diagnostic system, the secure element configured to filter the input of an on-board diagnostic operation that is untrusted.

17 Claims, 5 Drawing Sheets

(51) Int. Cl.
*G07C 5/02* (2006.01)
*G07C 5/08* (2006.01)
*G06F 13/10* (2006.01)
*G06F 13/40* (2006.01)
*H04L 9/32* (2006.01)
*H04W 12/10* (2009.01)
*G06F 21/62* (2013.01)
*G06F 21/60* (2013.01)
*G06F 21/12* (2013.01)
*H04W 12/08* (2009.01)
*H04L 29/08* (2006.01)

(52) U.S. Cl.
CPC .......... *G06F 21/121* (2013.01); *G06F 21/123* (2013.01); *G06F 21/60* (2013.01); *G06F 21/62* (2013.01); *G07C 5/02* (2013.01); *G07C 5/08* (2013.01); *H04L 9/3247* (2013.01); *H04L 63/0823* (2013.01); *H04W 12/10* (2013.01); *H04L 63/101* (2013.01); *H04L 67/12* (2013.01); *H04W 12/08* (2013.01)

(56) References Cited

U.S. PATENT DOCUMENTS

2015/0195297 A1* 7/2015 Ben Noon ............ B60R 16/023
 726/22
2015/0271201 A1* 9/2015 Ruvio ................. H04L 63/1408
 726/23
2016/0019389 A1* 1/2016 Yan ....................... G06F 21/554
 726/23

* cited by examiner

APPARATUS AND METHOD FOR TRANSPARENT, SECURE ELEMENT-BASED MEDIATION OF ON-BOARD DIAGNOSTIC OPERATIONS

CROSS-REFERENCE TO RELATED APPLICATION(S)

This application claims the benefit under 35 U.S.C. § 119(e) of a U.S. Provisional application filed on Aug. 5, 2015 in the U.S. Patent and Trademark Office and assigned Ser. No. 62/201,457, the entire disclosure of which is hereby incorporated by reference.

TECHNICAL FIELD

The present disclosure relates to an apparatus and method for a secure architecture for connecting a motor vehicle to an LTE network or Bluetooth™ network via a vehicle's On-Board Diagnostic (OBD-II) interface. More particularly, the present disclosure relates to an apparatus and method for using a whitelist to prevent malicious OBD-II operation to be applied against an OBD-II system.

BACKGROUND

On-Board Diagnostic (OBD) systems are in most cars and light trucks on the road today. During the '70s and early 1980's manufacturers started using electronic means to control engine functions and diagnose engine problems. This was primarily to meet EPA emission standards. Through the years the on-board diagnostic systems have become more sophisticated. OBD-II, a standard introduced in the mid-'90s, provides almost complete engine control and also monitors parts of the chassis, body and accessory devices, as well as a diagnostic control network of the car. All cars built since Jan. 1, 1996 have the OBD-II systems.

Currently, an OBD-II system includes a port for receiving an attachment device. The attachment device contains functionality for allowing outside devices to transmit operations to the OBD-II system and receive in return diagnostic or status information of the automobile. The adapters have increased in functionality to include a modem that may transmit operations and receive the diagnostic or status information of the automobile via an LTE network, a Bluetooth™ network and the like.

In this manner, the adapter allows a myriad of untrusted devices to transmit operations and to receive the diagnostic or status information of the automobile. Additionally, where a modem provides a secure interface, the interface may be hacked by nefarious means.

Accordingly, there is a need for an apparatus and method for providing an improved more secure interface between an adapter and the on-board diagnostic system.

SUMMARY

Aspects of the present disclosure are to address at least the above-mentioned problems and/or disadvantages and to provide at least the advantages described below. Accordingly, an aspect of the present disclosure is to provide an apparatus and method for a secure architecture for connecting a motor vehicle to an LTE network or Bluetooth™ network via the vehicle's On-Board Diagnostic (OBD-II) interface.

In accordance with an aspect of the present disclosure, an attachment device for interfacing with an on-board diagnostic system of a vehicle is provided. The device includes an application processor configured to receive an input from a terminal, control processing of the input by the on-board diagnostic system, transmit a result of the processing of the input by the on-board diagnostic system to the terminal, and a secure element interposed in the communication path between the application processor and the on-board diagnostic system, the secure element configured to filter out the input of an on-board diagnostic operation that is untrusted. The application processor, the secure element and on-board diagnostic system are electrically connected.

In accordance with another aspect of the present disclosure, an attachment device for interfacing with an on-board diagnostic system of a vehicle is provided. The device includes an application processor configured to receive an input from a terminal, control processing of the input by the on-board diagnostic system, and transmit a result of the processing of the input by the on-board diagnostic system to the terminal, a secure element interposed in the communication path between the application processor and the on-board diagnostic system, the secure element configured to determine whether the input of an on-board diagnostic operation is trusted or untrusted, and a translator interposed in the communication path between the application processor and the secure element, the translator configured to process data between the application processor and the secure element. The application processor, the secure element, the translator and the on-board diagnostic system are electrically connected In accordance with another aspect of the present disclosure, a method of securely processing on-board diagnostic operations in an attachment device for interfacing with an on-board diagnostic system of a vehicle is provided. The method including receiving input from an external terminal, determining whether the input is trusted or untrusted, processing the input by the on-board diagnostic system when it has been determined that the input is trusted, and transmitting one of a result of the processing of the input by the on-board diagnostic system or an error code when the input is untrusted, to the external terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

DETAILED DESCRIPTION

Figure 1:
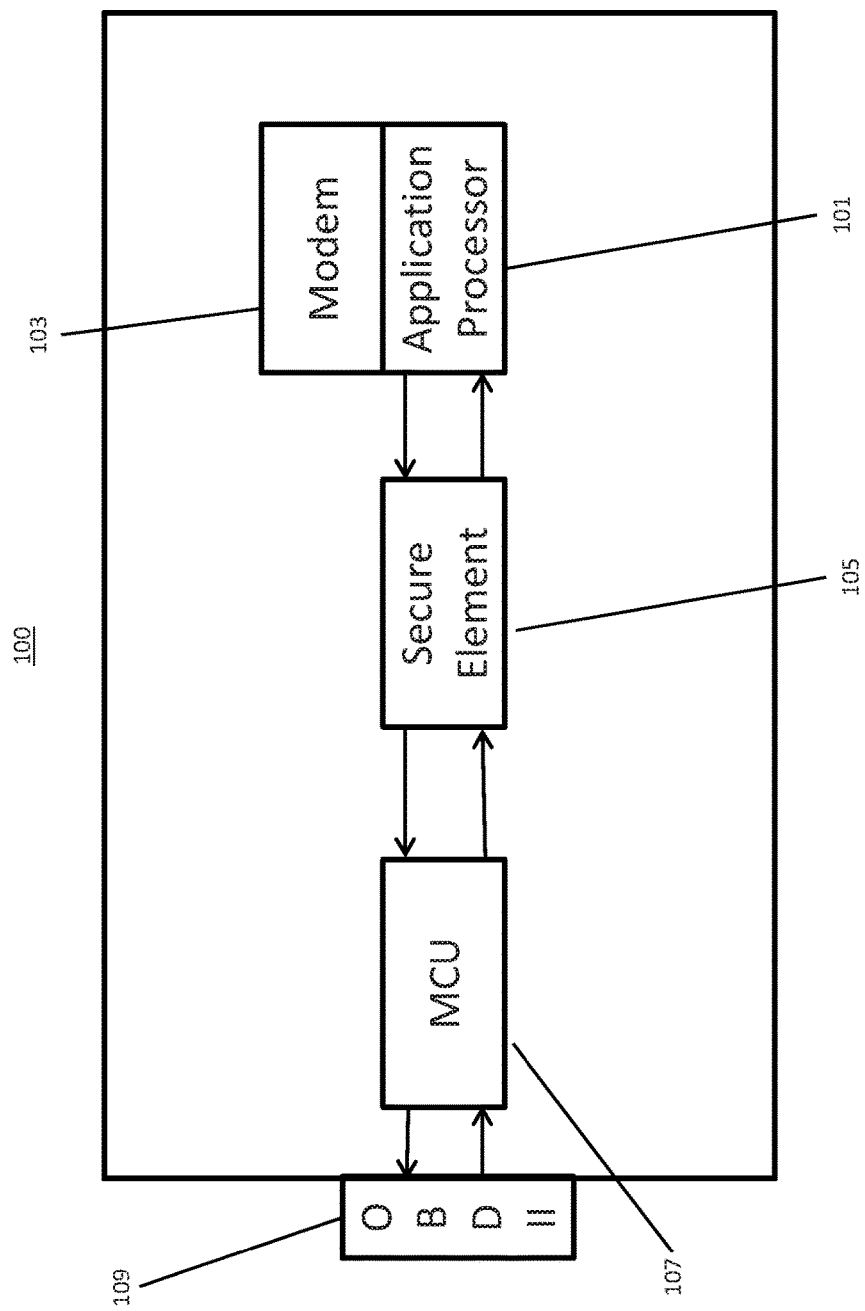
FIG. 1 is a diagram illustrating an architecture of an attachment device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Versatile Disk (DVD) player, an audio player, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for a secure architecture for connecting a motor vehicle to an LTE network or Bluetooth™ network via the vehicle's On-Board Diagnostic (OBD-II) interface.

FIG. 1 is a diagram illustrating an architecture of an attachment device according to various embodiments of the present disclosure.

Referring to FIG. 1, an attachment device 100 includes an application processor 101, a modem 103, a secure element 105, and a micro control unit (MCU) 107, but is not limited thereto. It will be understood that the MCU further connects to the On-Board Diagnostic (OBD) II system 109.

The application processor 101 receives operations from a remote device and in turn transmits the operation to the ODB II system 109 for processing. The ODB II system 109 processes the operations and transmits diagnostic or status back to the application processor 101 which in turn transmits the data to the remote device. The application processor 101 also allows the for firmware updates.

The application processor 101 receives operations and transmits data outwardly via the modem 103. The modem 103 may be connected via Bluetooth™ to a mobile terminal (not shown), such as a cell phone, tablet computer or the like. The modem may 103 may also connect a network, such as an LTE, WiFi or cellular network. Alternatively, the attachment device 100 may be attached to another device (not shown) via a Universal Serial Bus or other serial cable. The operations may either be transmitted to receive diagnostic data or to alter parameters that are used internally within the vehicle.

Inserted between the application processor 101 and the ODB II system 109 are the secure element 105 and the MCU 107. The MCU is responsible for translating OBD-II operations into a form appropriate for reception by an OBD-II port of the vehicle into which the attachment device 100 is inserted.

The secure element 105 provides a means of filtering out malicious operations that may cause permanent harm to the vehicle, the vehicle's components or the vehicle's passengers. For example, the vehicle may include an electronic control unit (ECU) which is made up of, for example, an Electronic/engine Control Module (ECM), a Powertrain Control Module (PCM), a Transmission Control Module (TCM), a Brake Control Module (BCM or EBCM), a Central Control Module (CCM), a Central Timing Module (CTM), a General Electronic Module (GEM), a Body Control Module (BCM), and a Suspension Control Module (SCM), but is not limited thereto.

A malicious operation to these systems may cause the vehicle to stop or become otherwise un-drivable. For example, the ECU is a type of electronic control unit that controls a series of actuators on an internal combustion engine of the vehicle in order to ensure optimal engine performance. It does so by reading values from a multitude of sensors within an engine, interprets the data using tables, and adjusts the engine actuators accordingly. An operation transmitted to the ECU to alter a table value may cause the ECU in turn to request more fuel than required for the current driving condition. The increase in fuel consumption may cause the vehicle to speed up, even though the driver may have removed his or her foot from the accelerator and begun depressing the brake causing the driver to lose control of the vehicle.

Thus, the secure element 105 prevents operations which a manufacturer may believe causes damage or injury to the vehicle or the vehicle's occupants. The secure element 105 may be implemented in hardware or a combination of hardware and software. In either implementation the secure element 105 may only be modified at the time of manufacture or by the manufacturer of the secure element 105. The secure element 105 so implemented prevents the application processor, maliciously attacked, from altering the criteria for filtering operations that the secure element 105 may process.

Figure 2:
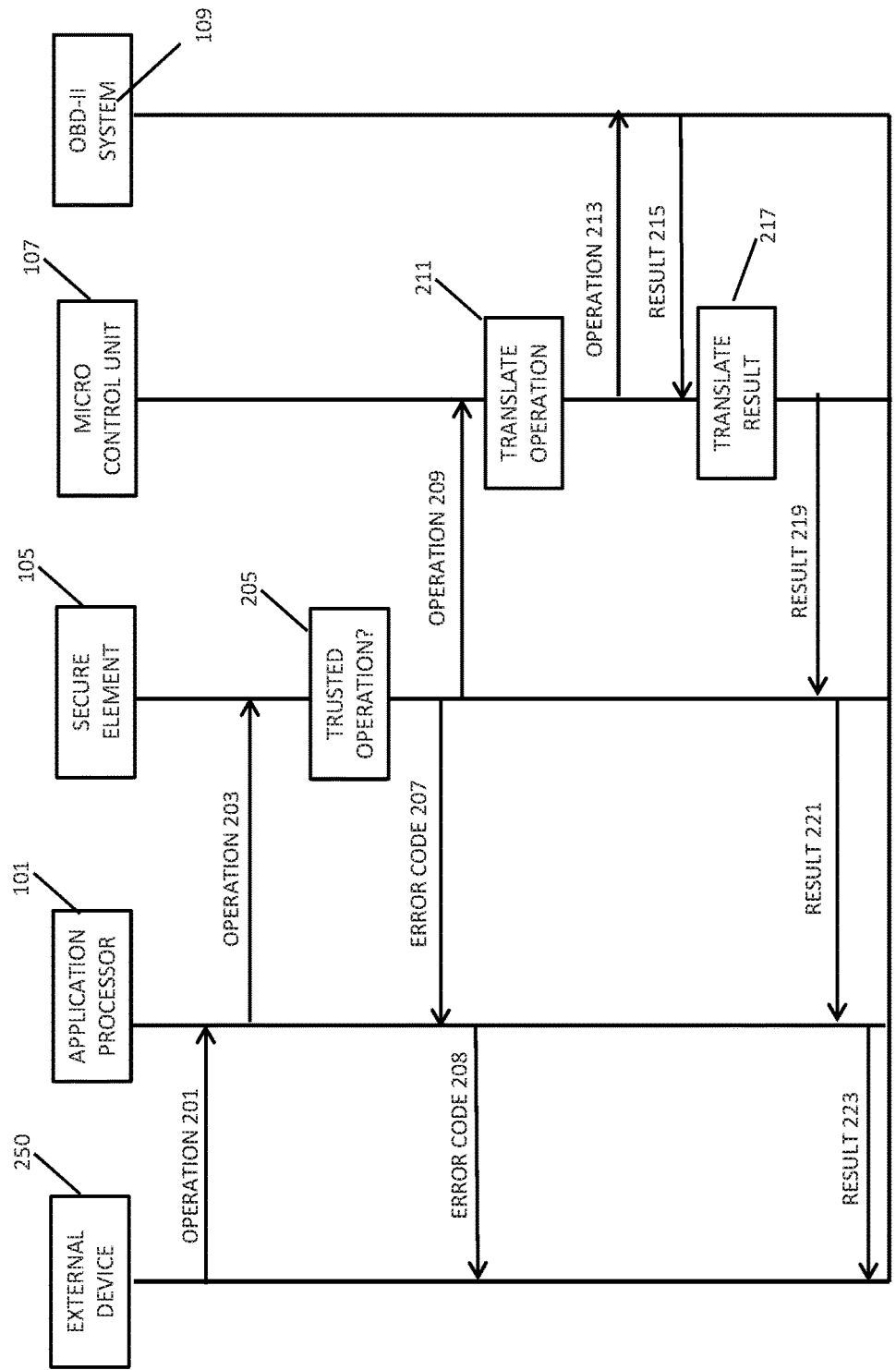
FIG. 2 is a system diagram illustrating data flow between components of an attachment device according to various embodiments of the present disclosure.

FIG. 2 is a system diagram illustrating data flow between components of an attachment device according to various embodiments of the present disclosure.

Referring to FIG. 2, an external device 250 transmits 201 an operation (i.e., OBD-II operation) to an application processor 101. In this example, the operation alters a parameter in the electronic ignition system of a vehicle. The operation is, for example, to shut an engine of the vehicle off. The application processor 101 upon receiving the operation forwards 203, the operation to a secure element 105.

The secure element 105 matches 205 the operation against a table of trusted operations (i.e., a whitelist). If the secure element 105 determines that the operation is not a trusted operation, the secure element 105 transmits 207 an error status code to the application processor 101. The application processor 101 in turn transmits the error status code 208 to the external device 250. It will be understood that a trusted operation is an OBD-II operation that is considered safe for processing by the OBD-II system. Thus, input used to reverse engineer (i.e., determine operations) the OBD-II system uses are filtered out prior to reaching the OBD-II system when the operation is not trusted. In this manner only trusted operations will pass through to the OBD-II system and the attempt to reverse engineer the OBD-II system only determines trusted operations.

However, if the operation was a request for current fuel consumption data, the secure element 105 determines the operation is a trusted operation. The secure element 105 may transmit 209 the operation to an MCU 107. The MCU 107 translates 211 and transmits 213 the operation into a form appropriate for reception by an OBD-II port of the vehicle. The OBD-II port is a connector that connects to one or more buses, including emissions information, drivetrain control components, and the like. OBD-II may use, for example, the following protocols SAE J1850 PWM, SAE J1850 VPW, ISO 9141-2, ISO 14230-4 KWP, ISO 15765-4 CAN, SAE J1939 CAN.

The OBD-II system 109 processes the operation and returns 215 the resulting fuel consumption data to the MCU 107. The MCU in turn translates 217 the resulting fuel consumption data into a form understandable by the application processor 101 and transmits 219 the resulting fuel consumption data to the secure element 105. The secure element 105 transmits 221 the resulting fuel consumption data to the application processor 101. The application processor 101 transmits 223 the resulting fuel consumption data to the external device 250. The external device 250 displays the result on a display.

Figure 3:
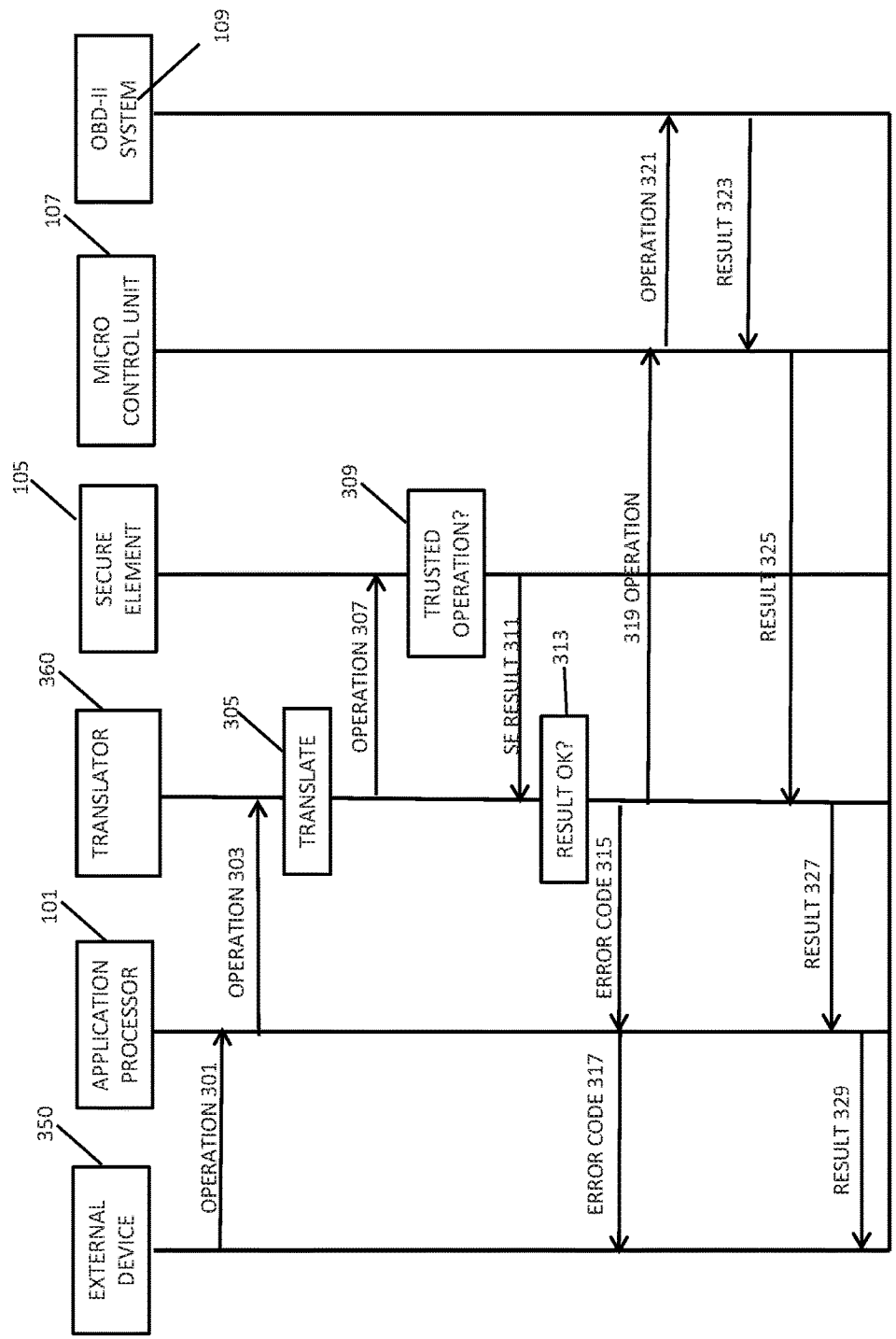
FIG. 3 is a system diagram illustrating data flow between components of an attachment device according to various embodiments of the present disclosure.

FIG. 3 is a system diagram illustrating data flow between components of an attachment device according to various embodiments of the present disclosure.

Referring to FIG. 3, an external device 350 transmits 301 an operation (i.e., OBD-II operation) to an application processor 101. The application processor 101 upon receiving the operation forwards 303, the operation to a translator 360.

The translator 360 is required to translate the operation when, for example, the application processor 101 to MCU 107 communications are incompatible with the secure element 107 due to an incompatible bus architecture with the secure element 105. This may be required when the secure element 105 is retrofitted into an existing attachment device 100 design.

The translator 360 translates 305 the operation and forwards 307 the operation to the secure element 105. The secure element 105 matches 309 the operation against a table of trusted operations (i.e., a whitelist). If the secure element 105 determines that the operation is not a trusted operation, the secure element 105 transmits 311 a secure element result to the translator 360 indicating that the operation is not permitted. However, if the secure element 105 determines that the operation is a trusted operation, the secure element 105 transmits 311 the secure element result to the translator 360 indicating that the operation is permitted.

The translator 360 determines from the secure element result whether the operation is permitted. If the operation is not permitted, the translator 360 transmits 315 an error status code to the application processor 101. The application processor 101 in turn transmits 317 the error status code to the external device 350.

However, if the operation is permitted, the translator 360 transmits 319 the operation to the MCU 107. The MCU translates the operation into a form appropriate for reception by an OBD-II port of the vehicle. The MCU 107 transmits 321 the operation to the OBD-II system.

The OBD-II system 109 processes the operation and returns 323 the result data to the MCU 107. The MCU in turn translates the result data into a form understandable by the application processor 101 and transmits 325 the result data to the translator 360. The translator 360 transmits 327 the result data to the application processor 101. The application processor 101 transmits 329 the result data to the external device 350. The external device 350 displays the result on a display.

While the discussion above referenced ODB-II operations sent from the external device to the application processor 101, it will be understood that malicious input of an unknown type (i.e., strings of random digits) used to determine operations will be filtered out. In this manner only trusted operations will pass through to the OBD-II system and the attempt to reverse engineer the OBD-II system only determines trusted operations.

Figure 4:
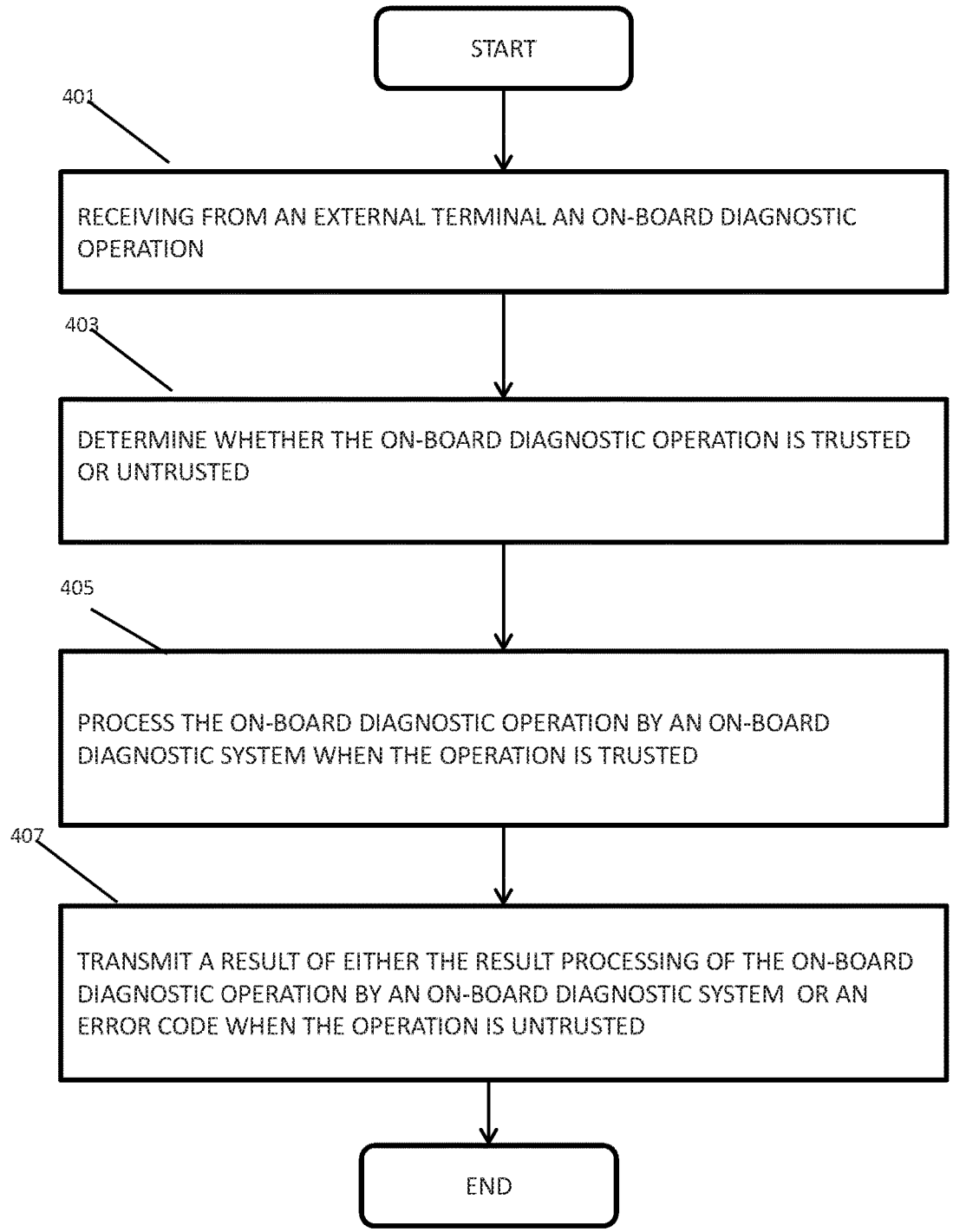
FIG. 4 is a flow chart illustrating processing of ODB-II operations via an attachment device according to various embodiments of the present disclosure.

FIG. 4 is a flow chart illustrating processing of ODB-II operations via an attachment device according to various embodiments of the present disclosure.

Referring to FIG. 4, at operation 401 the application processor 101 of the attachment device 100 receives from an external terminal (not shown) at least one of the plurality of on-board diagnostic operations.

At operation 403, the secure element 105 determines whether the at least one of the plurality of on-board diagnostic operations is trusted or untrusted. The secure element 105 makes this determination of whether the operation is trusted or untrusted by comparing the at least one of the plurality of on-board diagnostic operations to a table of trusted operations. The secure element 105 indicates that the at least one of the plurality of on-board diagnostic operations is trusted when the at least one of the plurality of on-board diagnostic operations matches an operation of the table of trusted operations, or indicates that the at least one of the plurality of on-board diagnostic operations is untrusted when the at least one of the plurality of on-board diagnostic operations does not match an operation of the table of trusted operations.

At operation 405, the secure element 105 processes the at least one of the plurality of on-board diagnostic operations by the on-board diagnostic system when it has been determined that the at least one of the plurality of on-board diagnostic operations is trusted.

At operation 407, the application processor 101 transmits one of a result of the processing of the at least one of the plurality of on-board diagnostic operations by the on-board diagnostic system or an error code when the at least one of the plurality of on-board diagnostic operations is untrusted, to the external terminal.

Figure 5:
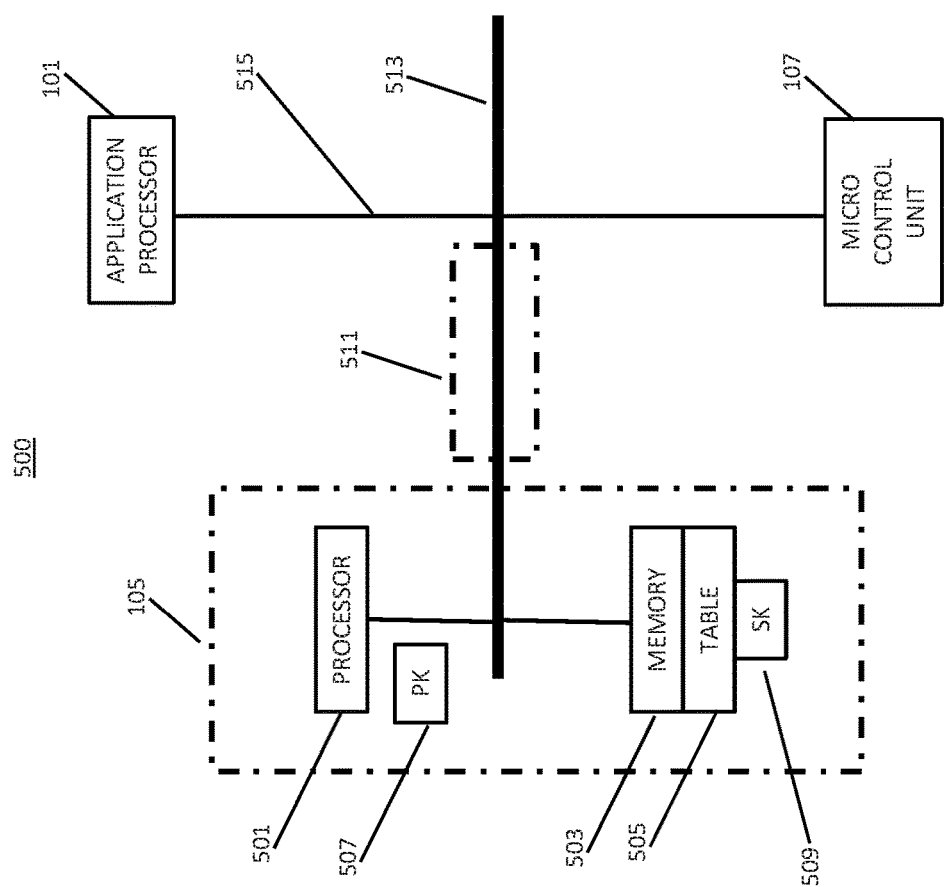
FIG. 5 is a diagram illustrating components of a secure element of an attachment device according to various embodiments of the present disclosure.

FIG. 5 is a diagram illustrating components of a secure element of an attachment device according to various embodiments of the present disclosure.

Referring to FIG. 5, an attachment device 500 includes an application processor 101, a micro control unit 107, a secure element 105, and a bus 513, but is not limited thereto. Alternatively, the attachment device 500 may include a translator 511 for providing an interface between a bus 515 between the application processor and the bus 513, when the buses of different communication types.

The secure element 105 includes a processor 501 and a memory 503. While a processor is illustrated for the sake of brevity, it is will be understood by those of ordinary skill in the art that the functionality of a programmed processor may also be performed by a chipset. The processor 501 executes software stored in the memory 503. The memory 503 may also include a table 505 of trusted operations (i.e., whitelist). While a whitelist has been used throughout, it will be understood that a blacklist may also be used to affect the same outcome.

When the attachment device 500 is manufactured, the secure element 105 is provided public key 507. The table 505 further is encrypted using a secret key 509. By this means a cryptologically generated table may be check for authenticity via the public key 507 prior to being stored in the memory 503.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing an apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are not intended to limit the scope of the present disclosure. Accordingly, the scope of the present disclosure should be understood as to include any and all modifications that may be made without departing from the technical spirit of the present disclosure.

What is claimed is:

1. An attachment device for interfacing with an on-board diagnostic system of a vehicle, the attachment device comprising:
    an application processor configured to:
        receive an input from a terminal,
        control processing of the input by the on-board diagnostic system, and
        transmit a result of the processing of the input by the on-board diagnostic system to the terminal;
    a secure element interposed in a communication path between the application processor and the on-board diagnostic system, the secure element comprising a processor that is separate from a processor of the application processor and is configured to filter out the input of an on-board diagnostic operation that is untrusted; and
    a micro control unit interposed between the secure element and the on-board diagnostic system,
    wherein the application processor, the secure element, the micro control unit and the on-board diagnostic system are electrically connected, and
    wherein the application processor, the secure element and the micro control unit are encased together.

2. The attachment device of claim 1,
wherein the micro control unit is configured to:
translate the input, the input including the on-board diagnostic operation received from the secure element into a format understood by a port of the vehicle,
transmit the translated on-board diagnostic operation to the on-board diagnostic system,
receive a result of performing the on-board diagnostic operation from the on-board diagnostic system, and
transmit the result of performing the on-board diagnostic operation to the secure element.

3. The attachment device of claim 2, wherein, when the application processor is controlling the processing of the input by the on-board diagnostic system, the application processor is further configured to:
transmit the input to the secure element, and
receive a result of performing or not performing the input from the secure element.

4. The attachment device of claim 3, wherein, when the secure element is filtering out the input of the on-board diagnostic operation that is untrusted, the secure element is further configured to:
receive the input transmitted by the application processor,
compare the input to a table of trusted operations,
transmit an error code to the application processor when the input does not match any operation in the table of trusted operations, and
retransmit the on-board diagnostic operation to the micro control unit when the input matches an operation in the table of trusted operations.

5. The attachment device of claim 4, wherein the table of trusted operations is cryptographically signed with a private key corresponding to a public key held by the secure element.

6. The attachment device of claim 5, wherein, when updating the table of trusted operations, the secure element is further configured to verify a signature of a new table of trusted operations prior to storing the new table of trusted operations as the table of trusted operations.

7. An attachment device for interfacing with an on-board diagnostic system of a vehicle, the attachment device comprising:
an application processor configured to:
receive an input from a terminal,
control processing of the input by the on-board diagnostic system, and
transmit a result of the processing of the input by the on-board diagnostic system to the terminal;
a secure element interposed in a communication path between the application processor and the on-board diagnostic system, the secure element comprising a processor that is separate from a processor of the application processor and is configured to determine whether the input of an on-board diagnostic operation is trusted or untrusted;
a translator interposed in the communication path between the application processor and the secure element, the translator configured to process data between the application processor and the secure element; and
a micro control unit interposed in the communication path between the translator and the on-board diagnostic system,
wherein the application processor, the secure element, the translator, the micro control unit and the on-board diagnostic system are electrically connected, and
wherein the application processor, the secure element and the micro control unit are encased together.

8. The attachment device of claim 7,
wherein the micro control unit is configured to:
translate the on-board diagnostic operation received from the translator into a format understood by a port of the vehicle,
transmit the translated at least one of the operation to the on-board diagnostic system,
receive a result of performing the on-board diagnostic operation from the on-board diagnostic system, and
transmit the result of performing the on-board diagnostic operation to the translator.

9. The attachment device of claim 8, wherein, when the application processor is controlling the processing of the input by the on-board diagnostic system, the application processor is further configured to:
transmit the input to the translator, and
receive the result of performing or not performing the input from the translator.

10. The attachment device of claim 9, wherein, when the translator processes data between the application processor and the secure element, the translator is further configured to:
modify the input for use on a bus connected to the secure element,
transmit the modified input to the secure element,
receive an indication of whether the input is trusted,
transmit an error code as the result to the application processor when the indication indicates the input is not trusted,
transmit the on-board diagnostic operation to the micro control unit when the indication indicates the input is trusted, and
return to the application processor,
wherein the result of performing the on-board diagnostic operation is received from the micro control unit.

11. The attachment device of claim 10, wherein, when the secure element is determining whether the input is trusted or untrusted, the secure element is further configured to:
receive the input transmitted by the application processor,
compare the input to a table of trusted operations,
transmit an indication that the input is trusted when the input matches an operation in the table of trusted operations, and
transmit an indication that the input is untrusted when the input does not match an operation in the table of trusted operations.

12. The attachment device of claim 11, wherein the table of trusted operations is cryptographically signed with a private key corresponding to a public key held by the secure element.

13. The attachment device of claim 12, wherein, when updating the table of trusted operations, the secure element is further configured to verify a signature of a new table of trusted operations prior to storing the new table of trusted operations as the table of trusted operations.

14. A method of securely processing on-board diagnostic operations in an attachment device for interfacing with an on-board diagnostic system of a vehicle, the method comprising:
receiving input from an external terminal;
determining whether the input is trusted or untrusted;
processing the input by the on-board diagnostic system when it has been determined that the input is trusted; and transmitting one of a result of the processing of the input by the on-board diagnostic system or an error code when the input is untrusted, to the external terminal, wherein the determining that the input is trusted or untrusted is performed by a secure element interposed in a communication path between an application processor and the on-board diagnostic system, wherein the secure element comprises a processor for performing filtering that is separate from a processor of the application processor, wherein the determining of whether the input is trusted or untrusted is performed by the secure element interposed between the application processor and a micro control unit of the attachment device, wherein the application processor, the secure element, the micro control unit and the on-board diagnostic system are electrically connected, and wherein the application processor, the secure element and the micro control unit are encased together.

15. The method of claim 14, wherein the determining of whether the input is trusted or untrusted, further comprises:
comparing the input to a table of trusted operations,
indicating the input is trusted when the input matches an operation of the table of trusted operations, and
indicating the input is untrusted when input does not match an operation of the table of trusted operations.

16. The method of claim 15, wherein the table of trusted operations is cryptographically signed with a private key corresponding to a public key held by the secure element.

17. The method of claim 15, wherein, when updating the table of trusted operations, a signature of a new table of trusted operations is verified prior to storing the new table of trusted operations as the table of trusted operations.

* * * * *